United States Patent Office 3,567,507
Patented Mar. 2, 1971

3,567,507
ENCAPSULATED ELECTRONIC COMPONENT
Thomas F. Cobb, Ansonia, and William R. Belko, Jr., Huntington, Conn., assignors to Vitramon Incorporated, Monroe, Conn.
No Drawing. Continuation-in-part of application Ser. No. 582,491, Sept. 28, 1966. This application Apr. 30, 1968, Ser. No. 725,540
Int. Cl. H01l 1/10
U.S. Cl. 117—212                                             3 Claims

ABSTRACT OF THE DISCLOSURE

A method of hermetically encapsulating electronic components comprising coating less than all of the surfaces with a first refractory material and firing the component to glaze the first refractory material; and, coating the remaining surfaces with a second refractory material having a lower melting temperature than the first refractory material and again firing the component to glaze the second refractory material.

---

This application is a continuation-in-part of an early copending application, Ser. No. 582,491, filed Sept. 28, 1966, now abandoned.

Heretofore electronic components have been sealed against the elements either by enclosing them in a plastic, metal or glass container, or by coating them with a wax, plastic or other organic covering. However, each of these approaches to the problem of protecting the component from the effects of moisture and airborne contaminants is essentially only half of the answer. Ideally, a sealant should both hermetically enclose the component, i.e., be impervious to gases and liquids, and add a minimum of extra volume to the dimensions of the component. The container approach, while it can hermetically seal the component, is inordinately large relative to the component it protects. Organic coatings, on the other hand, add very little volume to the dimensions of the component, but do not hermetically seal the component.

It is therefore a primary object of the present invention to overcome the above problems and hermetically seal electronic components without measurably increasing the dimensions of the component. This objective is attained by coating the components with a thin layer of a refractory material-containing solution and firing the coated component to solidify or glaze the refractory material. A refractory material encapsulant, such as, for example, glass or ceramic or porcelain aside from providing a hermetic seal, is also extremely hard, has a high melting temperature and is impervious to attack from most chemicals. In addition, if the component has a ceramic, porcelain or other refractory material surface layer the glazing process will melt the refractory material at the component-coating interface, thereby forming a molecular bond between the coating and the component.

In experimenting with glass, ceramic and porcelain coatings for electronic components, applicants found that they faced one major obstacle, i.e., how to coat all of the surfaces of the component. Basically, the problem was that if they tried to coat all of the surfaces of the component the coating on the surface resting on the furnace base plate would adhere to the base plate, as well as the component, during the firing cycle. The result was that the components became welded to the base plate and the entire batch was ruined and had to be scrapped. Attempts at analogizing and borrowing from the prior art of the dinnerware industry proved fruitless. The techniques used in the dinnerware industry require supporting the coated objects in the funace on a series of point suspensions. After the glaze and encapsulant is fired, the part is removed from the furnace and the fused supports are broken off, leaving small bare uncoated spots on the object. Such a result is entirely unacceptable for electronic components; first, because the uncoated area could amount to 20 percent or more of the limited surface area of the component; and second, because the hermetic seal would be broken and the component would be subject to the deleterious effects of moisture and other contaminants.

It is therefore another object of the present invention to overcome the above problem and hermetically seal all of the surfaces of an electronic component with a refractory material coating. This objective is attained by using at least two separate coating compositions having different melting temperatures to seal the component. The first composition, having the higher melting temperature, is applied only to preselected surfaces of the component; and, the component fired to glaze the coating. During the firing cycle the component rests on the furnace base plate on one of the uncoated surfaces. After the first firing is complete and the component has cooled, the remaining surfaces can be coated with the second composition, having the lower melting point and the firing process repeated. During this second firing the component rests on one of the previously glazed surfaces and the temperature in the furnace is maintained below the melting temperature of the first coating composition. In this manner, the component can be completely encapsulated and hermetically sealed with a refractory material coating without the coating adhering to both the component and the furnace base plate. It should be understood that the choice of encapsulants and the number of compositions used is dependent upon the composition of the component surface and the physical properties desired. Once this determination is made, however, the only remaining criteria is that there must be a differential between the melting points of the compositions so that previously fired coatings will remain in the solid state during subsequent firings.

The following example is given by way of illustration only and is not intended to in any way limit or place metes and bounds on the present invention:

A high temperature glaze, which may have the following composition:

| Constituent: | Percent by weight |
|---|---|
| PbO | 50 |
| $SiO_2$ | 27 |
| $B_2O_3$ | 16 |
| $TiO_2$ | 3.5 |
| $ZrO_2$ | 3.5 |
| | 100 | is prepared by suspending the pre-reacted solid constituents in a volatile fluid. A thin layer of the glaze is then sprayed, painted or otherwise coated onto selected surfaces of the component, leaving at least one surface uncoated, and the component is transferred to a furnace, resting on the furnace base plate on one of the uncoated surfaces. The furnace is heated to 1550° F., and maintained at that temperature until the suspending fluid is volatilized and the glaze is fired. Finally, the furnace temperature is gradually reduced and the glaze coating on the selected surfaces hardened to complete the first coating maturation cycle.

A second coating or low-temperature glaze, which may have the following composition.

| Constituent: | Percent by weight |
|---|---|
| PbO | 80 |
| $SiO_2$ | 5 |
| $B_2O_3$ | 10 |
| $Al_2O_3$ | 5 |
| | 100 | is then prepared by suspending the pre-reacted solid constituents in a volatile fluid. The second coating composition is sprayed, painted or otherwise coated onto the the remaining, previously uncoated, surfaces of the component and the component transferred to the furnace for firing. In this case, however, the component rests on the furnace base plate on one of the previously coated surfaces so that, again, the component can be fired without the glaze adhering to the furnace base plate. The temperature of the furnace is raised to 1100° F. to vaporize off the suspending fluid and fire the second, low-temperature, coating. Since the temperature in the furnace is maintained well below the 1550° F. melting point of the high-temperature glaze there is no danger of the first glaze melting and welding the component to the furnace base plate. After firing the completely coated component is removed from the furnace and cooled to complete the maturation process. Thus, in this manner, components can now be completely coated with a refactory material glaze and hermetically sealed against the ambient atmosphere.

As this invention may be embodied in several forms without departing from the spirit or essential characteristics thereof, the present embodiments are illustrative and not restrictive. The scope of the invention is defined by the appended claims rather than by the description preceding them, and all embodiments which fall within the meaning and range of equivalency of the claims are, therefore, intended to be embraced by those claims.

What is claimed is:

1. A hermetically sealed electronic component comprising a body having a plurality of surfaces, the surfaces being divided into a first group containing at least one but less than all of the surfaces of the component and a second group containing the remaining surfaces of the component, a first refractory material chosen from the class consisting of ceramics and glass covering only the surfaces of the first group and a second refractory material chosen from the group consisting of ceramics and glass and having a lower melting temperature than the first refractory material covering only the surfaces of the second group.

2. A method or hermetically sealing electronic components comprising the steps of:
   (a) applying a layer of a first refractory material chosen from the group consisting of ceramics and glass suspended in a volatile liquid to less than all of the surfaces of the component;
   (b) firing the component to volatilize the liquid and glaze the first refractory material;
   (c) applying a layer of a second refractory material chosen from the group consisting of ceramics and glass suspended in a volatile liquid and having a melting temperature sufficiently below that of the first refractory material such that the first refractory material will remain a solid at the melting temperature of the second refractory material to only the surfaces of the component not covered by the first refractory material; and
   (d) firing the component to volatilize the liquid and glaze the second refractory material.

3. A method as in claim 2 wherein the component rests on an uncoated surface during the firing to glaze the first refractory material and the component rests on a surface coated with the first refractory material during the firing to glaze the second refractory material.

References Cited

UNITED STATES PATENTS

| 3,325,586 | 6/1967 | Suddick | 29—588 |
| 3,310,719 | 3/1967 | Seney | 117—215X |

OTHER REFERENCES

Kenney, J. B.: "The Complete Book of Pottery Making," Greenberg Publisher, New York, 1949, pp. 172–173.

ALFRED L. LEAVITT, Primary Examiner

A. GRIMALDI, Assistant Examiner

U.S. Cl. X.R.

29—588; 117—215; 264—61, 272; 317—234